United States Patent
Ahn et al.

(10) Patent No.: US 9,054,390 B2
(45) Date of Patent: *Jun. 9, 2015

(54) ELECTROLYTE FOR LITHIUM SECONDARY BATTERY AND LITHIUM SECONDARY BATTERY COMPRISING THE SAME

(71) Applicant: LG Chem, Ltd., Seoul (KR)

(72) Inventors: Kyoung Ho Ahn, Daejeon (KR); Chul Haeng Lee, Daejeon (KR); Min Jung Kim, Daejeon (KR); Doo Kyung Yang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/098,921

(22) Filed: Dec. 6, 2013

(65) Prior Publication Data

US 2014/0093788 A1  Apr. 3, 2014

Related U.S. Application Data

(63) Continuation of application No. PCT/KR2013/008076, filed on Sep. 6, 2013.

(30) Foreign Application Priority Data

Sep. 21, 2012 (KR) .................. 10-2012-0105092

(51) Int. Cl.
*H01M 10/052* (2010.01)
*H01M 10/0567* (2010.01)
*H01M 10/0568* (2010.01)
*H01M 10/0569* (2010.01)

(52) U.S. Cl.
CPC ............ *H01M 10/052* (2013.01); *Y02E 60/122* (2013.01); *Y02T 10/7011* (2013.01); *H01M 10/0567* (2013.01); *H01M 10/0568* (2013.01); *H01M 10/0569* (2013.01)

(58) Field of Classification Search
None
See application file for complete search history.

(56) References Cited

U.S. PATENT DOCUMENTS

| | | | |
|---|---|---|---|
| 5,274,159 A | | 12/1993 | Pellerite et al. |
| 2003/0170550 A1* | | 9/2003 | Ugawa et al. .................. 429/331 |
| 2005/0084765 A1 | | 4/2005 | Lee et al. |
| 2011/0008684 A1* | | 1/2011 | Jeon et al. ...................... 429/338 |
| 2011/0318647 A1* | | 12/2011 | Lee et al. ....................... 429/311 |
| 2012/0034533 A1 | | 2/2012 | Hong et al. |
| 2012/0237838 A1 | | 9/2012 | Uesaka |
| 2014/0093789 A1* | | 4/2014 | Ahn et al. ...................... 429/331 |

FOREIGN PATENT DOCUMENTS

| | | |
|---|---|---|
| EP | 2405518 A2 | 1/2012 |
| KR | 2005-0078443 A | 8/2005 |
| KR | 2009-0100249 A | 9/2009 |
| KR | 2011-0005066 A | 1/2011 |
| KR | 2012-0079390 A | 7/2012 |
| WO | 2009116740 A2 | 9/2009 |

OTHER PUBLICATIONS

Okazoe (Appl. Sci. 2012, 2, 327-341).*
Okazoe (Appl. Sci. 2012, 2, 327-341) [Published Apr. 10, 2012] Document included in PTO-892 mailed Apr. 30, 2014.*
Chou et al. "The compatibility of transition metal oxide/carbon composite anode and ionic liquid electrolyte for the lithium-ion battery" J. Appl. Electrochem (2011) 41, pp. 1261-1267.
Extended European Search Report for Application No. Feb. 4, 2015.

* cited by examiner

*Primary Examiner* — Jeremiah Smith
(74) *Attorney, Agent, or Firm* — Lerner, David, Littenberg, Krumholz & Mentlik, LLP

(57) ABSTRACT

The present disclosure relates to an electrolyte for a lithium secondary battery, comprising a non-aqueous solvent, a lithium salt and an additive having a perfluoroalkyl group. By including the additive having a specific structure in the electrolyte, the output of the lithium secondary battery can be improved greatly.

14 Claims, 3 Drawing Sheets

ELECTROLYTE FOR LITHIUM SECONDARY BATTERY AND LITHIUM SECONDARY BATTERY COMPRISING THE SAME

CROSS-REFERENCE TO RELATED APPLICATION

The present application is a continuation of International Application No. PCT/KR2013/008076, filed Sep. 6, 2013, which claims the benefit of Korean Patent Application No. 10-2012-0105092, filed Sep. 21, 2012, the disclosures of which are incorporated herein by reference.

TECHNICAL FIELD

The present disclosure relates to an electrolyte for a lithium secondary battery. More particularly, the present disclosure relates to an electrolyte comprising a compound having a perfluoroalkyl group as an additive and a lithium secondary battery comprising the electrolyte.

BACKGROUND ART

With the recent advancement in information technology, electronic devices are becoming smaller sized, lighter and more portable. As a result, demand on batteries with higher energy density as power source of these electronic devices is also increasing. The lithium secondary battery is a battery capable of satisfying this requirement and studies are being actively carried out thereabout. The lithium secondary battery comprises a cathode, an anode, an electrolyte providing a path for lithium ions between the cathode and the anode and a separator. Electric energy is produced through oxidation-reduction reactions as the lithium ions are intercalated into and deintercalated from the cathode and the anode.

A non-aqueous electrolyte used in a lithium secondary battery generally includes an electrolyte solvent and an electrolyte salt. However, the electrolyte solvent is decomposed on the electrode surface or co-intercalated between the carbonaceous anode layers during charging and discharging of the battery, thereby collapsing the anode structure and damaging stability of the battery.

It is known that such problems can be solved by a solid electrolyte interface (SEI) film formed on the anode surface owing to reduction of the electrolyte solvent during initial charging of the battery. However, the SEI film is generally insufficient to serve as a film for continuously protecting the anode and its life and performance are deteriorated after repeated charging and discharging of the battery. In particular, the SEI film of the existing lithium secondary battery is thermally unstable. Thus, if the battery is operated or kept at high temperature, the SEI film may collapse easily with time due to electrochemical energy and thermal energy. As a result, the battery performance is deteriorated at high temperature. Particularly, gas such as $CO_2$ is continuously generated due to collapse of the SEI film, decomposition of the electrolyte, or the like. Consequently, the internal pressure and thickness of the battery are increased.

In order to solve these problems, a method of using, for example, vinylene carbonate as an electrolyte additive for forming a film on the anode surface was proposed. Although vinylene carbonate exhibits superior storage performance at high temperature and superior cycle performance, output performance is not at low temperature.

Recently, the lithium secondary battery is used for various purposes, from general electronic devices to various applications including electric vehicles. In this regard, demand on a high-output battery is also increasing. Accordingly, a battery capable of providing high output not only at high temperature but also at low temperature is necessary.

DISCLOSURE

Technical Problem

The present disclosure provides a non-aqueous electrolyte for a lithium secondary battery capable of improving the output characteristics of a lithium secondary battery and a lithium secondary battery comprising the same.

Technical Solution

In one general aspect, the present disclosure provides an electrolyte for a lithium secondary battery, comprising: a non-aqueous solvent; a lithium salt; and a compound of a specific structure having a perfluoroalkyl group as an additive.

In another general aspect, the present disclosure provides a lithium secondary battery comprising the electrolyte.

Advantageous Effects

A lithium secondary battery prepared using the electrolyte of the present disclosure may have improved output characteristics.

In particular, a battery prepared using an electrolyte including the additive of a specific structure described in the present disclosure has remarkably improved output characteristics as compared to one prepared using an electrolyte not including the additive.

DESCRIPTION OF DRAWINGS

FIG. 1 shows HPPC output data for charging at −30° C.
FIG. 2 shows HPPC output data for discharging at −30° C.
FIG. 3 shows HPPC output data for charging at room temperature.
FIG. 4 shows HPPC output data for discharging at room temperature.
-■-: Comparative Example 2
-●-: Example 4
-▲-: Example 5
-▼-: Example 6

BEST MODE

Figure 1:
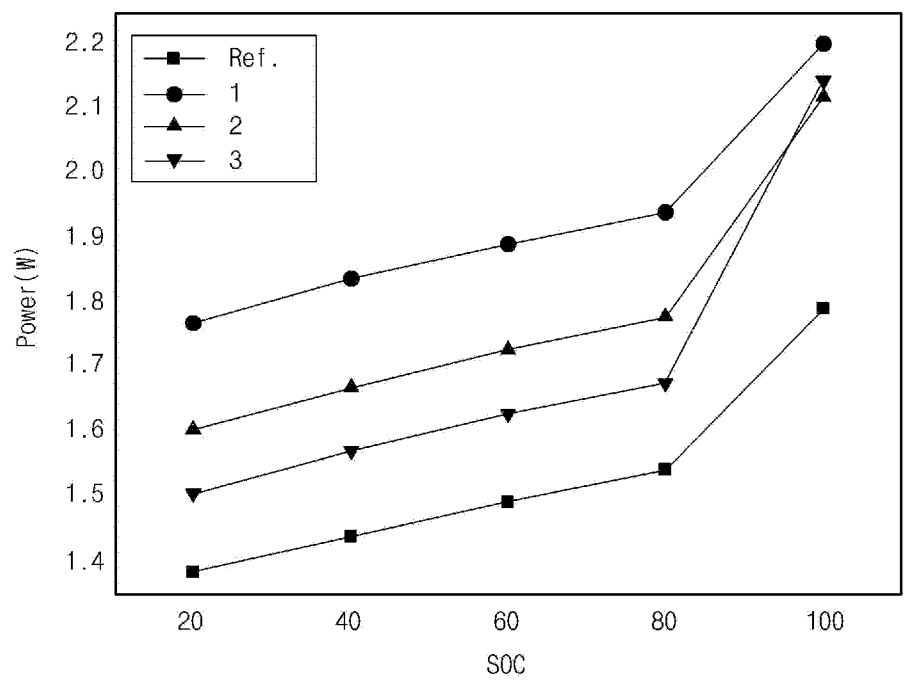
FIGS. 1-4 show the result of an HPPC test of secondary batteries using electrolytes of Examples and Comparative Examples.

The present disclosure provides an electrolyte for a lithium secondary battery, comprising:
a non-aqueous solvent;
a lithium salt; and
one or more additive selected from compounds of Chemical Formulas 1-3.

[Chemical Formula 1]

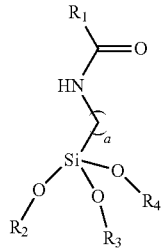

wherein, $R_1$ represents a $C_2$-$C_8$ perfluoroalkyl group;

$R_2$, $R_3$ and $R_4$ independently represent a $C_1$-$C_3$ alkyl group; and a represents an integer selected from 1 to 5.

[Chemical Formula 2]

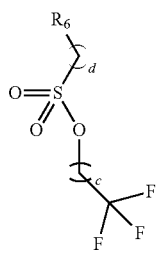

wherein, $R_6$ represents a $C_2$-$C_8$ perfluoroalkyl group;

c represents an integer selected from 1 to 7; and d represents an integer selected from 0 to 3.

[Chemical Formula 3]

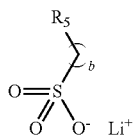

wherein, $R_5$ represents a $C_2$-$C_8$ perfluoroalkyl group; and b represents an integer selected from 0 to 3.

The compound of Chemical Formula 1 may be a compound of Chemical Formula 1a:

Chemical Formula 1a

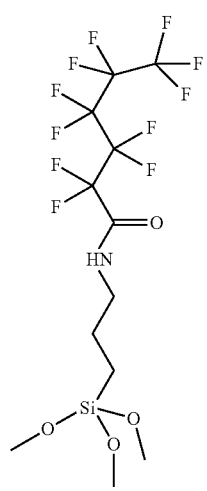

The compound of Chemical Formula 2 may be a compound of Chemical Formula 2a:

Chemical Formula 2a

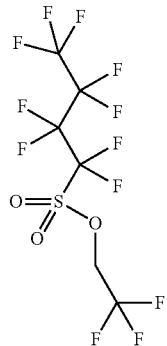

The compound of Chemical Formula 3 may be a compound of Chemical Formula 3a:

Chemical Formula 3a

The compounds of Chemical Formulas 1-3 may be used either alone or in combination.

The one or more additive selected from the compounds of Chemical Formulas 1-3 may be included in an amount of 0.1-10 parts by weight based on 100 parts by weight of the electrolyte.

The non-aqueous solvent used in the electrolyte of the present disclosure may be one commonly used in an electrolyte for a lithium secondary battery, without particular limitation. Specifically, one or more solvent selected from the group consisting of ethylene carbonate (EC), diethyl carbonate (DEC), ethyl methyl carbonate (EMC), dimethyl carbonate (DMC), propylene carbonate (PC), dipropyl carbonate (DPC), butylene carbonate, methyl propyl carbonate, ethyl propyl carbonate, dimethyl sulfoxide, acetonitrile, dimethoxyethane, diethoxyethane, tetrahydrofuran, N-methyl-2-pyrrolidone (NMP), γ-butyrolactone and sulfolane may be used.

The lithium salt used in the electrolyte of the present disclosure may be one commonly used in an electrolyte for a lithium secondary battery, without particular limitation. Specifically, one or more solvent selected from the group consisting of $LiPF_6$, $LiBF_4$, LiCl, LiBr, LiI, $LiClO_4$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$ and $(CF_3SO_2)_2NLi$ may be used.

The present disclosure also provides a lithium secondary battery comprising a cathode, an anode and the electrolyte described above.

The lithium secondary battery of the present disclosure may be prepared by injecting the electrolyte into an electrode structure consisting of a cathode, an anode and a separator interposed between the cathode and the anode. The cathode, anode and separator of the electrode structure may be those commonly used in a lithium secondary battery.

As a specific example, a cathode active material used in the cathode may be a lithium-containing transition metal oxide. For example, one or more selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}M-n_yO_2$, $LiNi_{1-y}Mn_yO_2$ ($0\leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$ and $LiFePO_4$ may be used. In addition to the oxide, a sulfide, a selenide, a halide, etc. may also be used.

As an anode active material used in the anode, a carbon material, lithium metal, silicon, tin, LTO, etc., which can intercalate or deintercalate lithium ions, may be used in general. Specifically, a carbon material may be used. The carbon material may be low-crystalline carbon or high-crystalline carbon. The low-crystalline carbon may be soft carbon or hard carbon as representative examples and the high-crystalline carbon may be natural graphite, kish graphite, pyrolytic carbon, mesophase pitch-based carbon fiber, mesocarbon microbead, mesophase pitch or high-temperature sintered carbon such as petroleum- or coal tar pitch-derived coke, as representative examples. The anode may contain a binder. Various kinds of binder polymers such as poly(vinylidene-fluoride-co-hexafluoropropylene) (PVdF-co-HFP) copolymer, polyvinylidene fluoride (PVdF), polyacrylonitrile, poly(methyl methacrylate), etc. may be used as the binder.

And, the separator may be formed of a commonly used porous polymer film, for example, a porous polymer film prepared from a polyolefin-based polymer such as ethylene homopolymer, propylene homopolymer, ethylene-butene copolymer, ethylene-hexene copolymer or ethylene-methacrylate copolymer, in a single layer or laminate form. Alternatively, the separator may be formed of a commonly used porous nonwoven fabric such as a nonwoven fabric made of high-melting point glass fiber, polyethylene terephthalate fiber, etc., but is not limited thereto.

The lithium secondary battery of the present disclosure may have various shapes which are not specially limited. For example, it may have a cylindrical can shape, an angled shape, a pouch shape or a coin shape.

Hereinafter, the present disclosure will be described in detail through examples. However, the following examples are for illustrative purposes only and it will be apparent to those of ordinary skill in the art that the scope of the present disclosure is not limited by the examples.

EXAMPLES 1-3 AND COMPARATIVE EXAMPLE 1

Preparation of Electrolyte

A solvent, a lithium salt and an additive were mixed as described in Table 1 to prepare electrolytes of the present disclosure (Examples 1-3) and one for comparison (Comparative Example 1).

TABLE 1

| | Additive (addition amount) | Lithium salt (addition amount) | Solvent (weight ratio based on 100 parts by weight) |
|---|---|---|---|
| Example 1 | Chemical Formula 1a (1 parts by weight) | $LiPF_6$ (1M) | EC/PC/EMC (30/20/50) |
| Example 2 | Chemical Formula 2a (1 parts by weight) | $LiPF_6$ (1M) | EC/PC/EMC (30/20/50) |
| Example 3 | Chemical Formula 3a (1 parts by weight) | $LiPF_6$ (1M) | EC/PC/EMC (30/20/50) |
| Comparative Example 1 | — | $LiPF_6$ (1M) | EC/PC/EMC (30/20/50) |

EXAMPLES 4-6 AND COMPARATIVE EXAMPLE 2

Preparation of Lithium Secondary Battery (Preparation of Cathode)

A cathode mixture slurry was prepared by adding 94 wt % of lithium cobalt oxide as a cathode active material, 3 wt % of carbon black as a conducting agent and 3 wt % of PVdF as a binder to N-methyl-2-pyrrolidone (NMP) as a solvent. The cathode mixture slurry was coated on a 20-μm thick aluminum (Al) foil as a cathode current collector and then dried to prepare a cathode.

(Preparation of Anode)

An anode mixture slurry was prepared by adding 96 wt % of carbon powder as an anode active material, 3 wt % of PVdF as a binder and 1 wt % of carbon black as a conducting agent to N-methyl-2-pyrrolidone (NMP) as a solvent. The anode mixture slurry was coated on a 10-μm thick copper (Cu) foil as an anode current collector and then dried to prepare an anode.

(Assemblage of Battery)

The cathode and the anode prepared above and a separator consisting of three layers of polypropylene/polyethylene/polypropylene (PP/PE/PP) were assembled by stacking and then the electrolyte of Examples 1-3 and Comparative Example 1 was injected respectively to prepare a battery.

The batteries of Examples 4-6 and Comparative Example 2 were prepared by injecting the electrolytes of Examples 1-3 and Comparative Example 1, respectively.

Test Example: HPPC Test

HPPC test was performed for the batteries of Examples 4-6 and Comparative Example 2.

The HPPC test is an internationally standardized method and specified by the US Department of Energy (DOE) (FreedomCAR Battery Test Manual for Power-Assist Hybrid Electric Vehicles, DOE/ID-11069, 2003).

Figure 2:
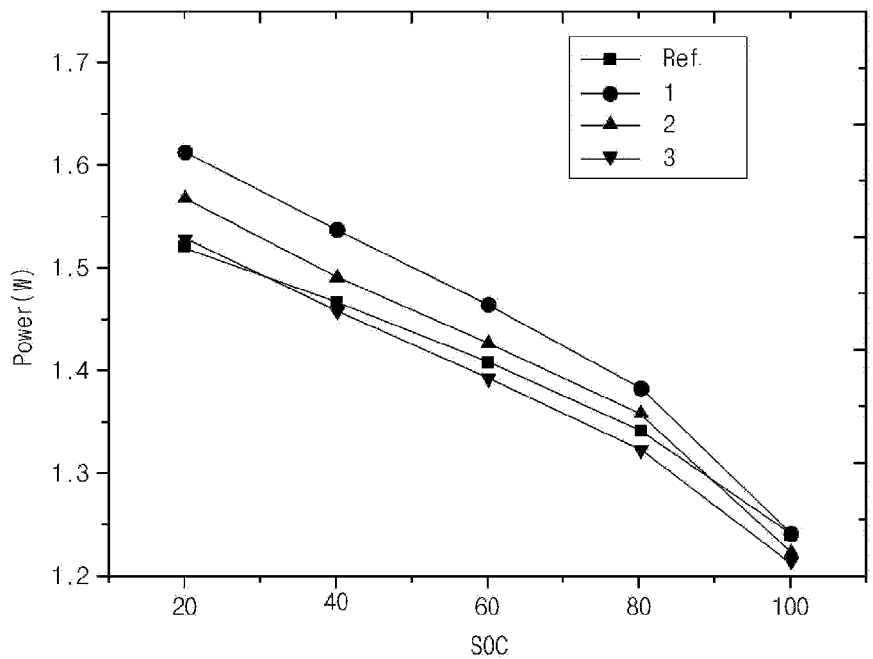
Figure 3:
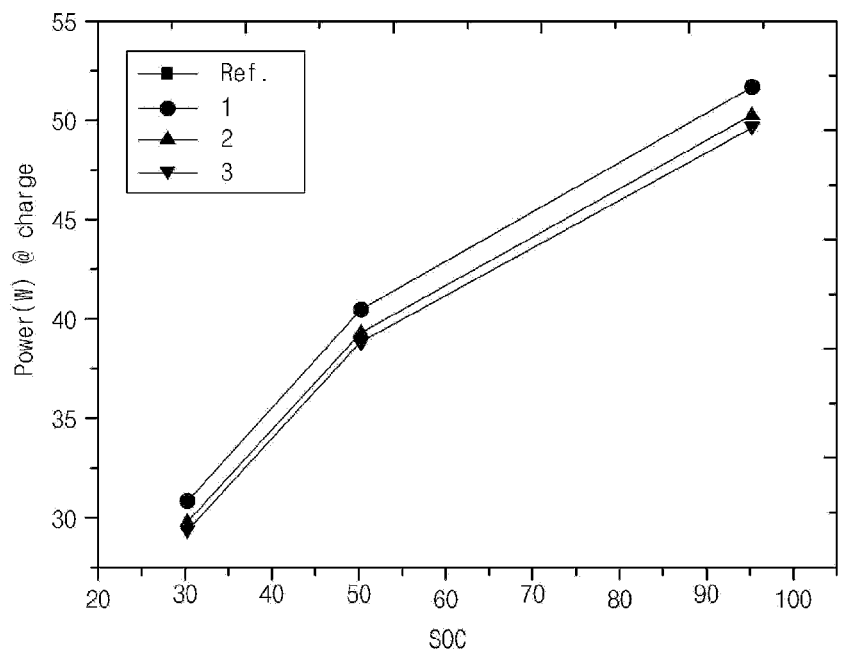
Figure 4:
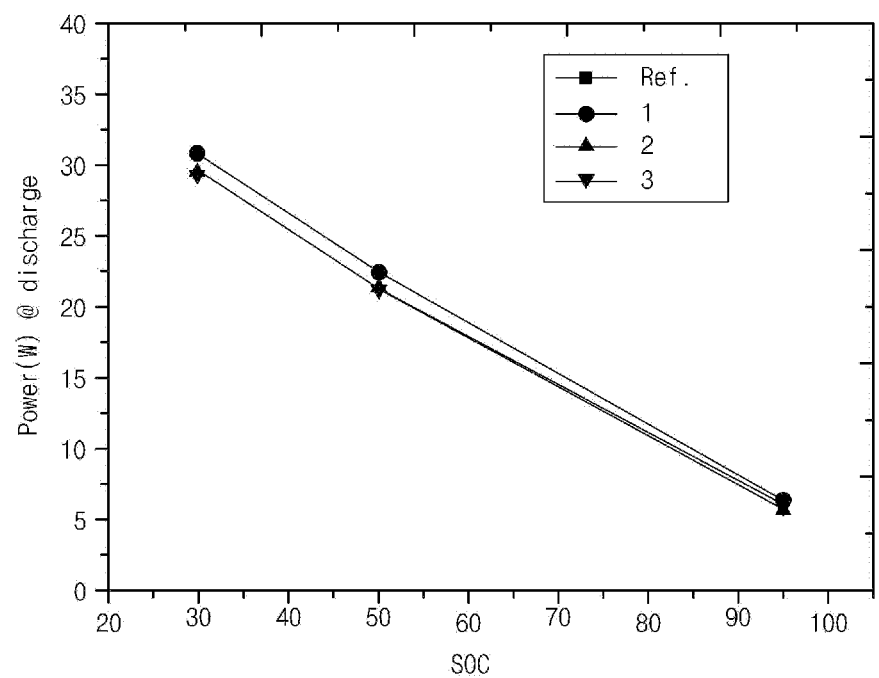

The HPPC test result is shown in FIGS. 1-4. FIG. 1 shows HPPC output data for charging at −30° C., FIG. 2 shows HPPC output data for discharging at −30° C., FIG. 3 shows HPPC output data for charging at room temperature and FIG. 4 shows HPPC output data for discharging at room temperature.

As can be seen from FIGS. 1-4, the batteries prepared according to the present disclosure (Examples 4-6) exhibit improved output characteristics as compared to the battery of Comparative Example 2. In particular, they exhibit improvement in output characteristics at low temperature.

The invention claimed is:

1. An electrolyte for a lithium secondary battery, comprising:
   a non-aqueous solvent;
   a lithium salt; and
   an additive including the compound of Chemical Formula 1a:

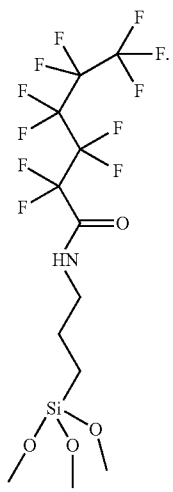

Chemcial Formula 1a

2. The electrolyte for a lithium secondary battery of claim 1, wherein the additive is included in an amount of 0.1-10 parts by weight based on 100 parts by weight of the electrolyte.

3. The electrolyte for a lithium secondary battery of claim 1, wherein the non-aqueous solvent is one or more selected from the group consisting of ethylene carbonate (EC), diethyl carbonate (DEC), ethyl methyl carbonate (EMC), dimethyl carbonate (DMC), propylene carbonate (PC), dipropyl carbonate (DPC), butylene carbonate, methyl propyl carbonate, ethyl propyl carbonate, dimethyl sulfoxide, acetonitrile, dimethoxyethane, diethoxyethane, tetrahydrofuran, N-methyl-2-pyrrolidone (NMP), γ-butyrolactone and sulfolane.

4. The electrolyte for a lithium secondary battery of claim 1, wherein the lithium salt is one or more selected from the group consisting of $LiPF_6$, $LiBF_4$, LiCl, LiBr, LiI, $LiClO_4$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$ and $(CF_3SO_2)_2NLi$.

5. A lithium secondary battery comprising a cathode, an anode and the electrolyte of claim 1.

6. The electrolyte for a lithium secondary battery of claim 1, wherein the additive further comprises a compound of Chemical Formula 3:

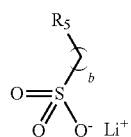

[Chemical Formula 3]

wherein
$R_5$ represents a $C_2$-$C_8$ perfluoroalkyl group; and
b represents an integer selected from 0 to 3.

7. The electrolyte for a lithium secondary battery of claim 6, wherein the compound of Chemical Formula 3 is represented by Chemical Formula 3a:

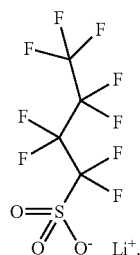

Chemical Formula 3a

8. The electrolyte for a lithium secondary battery of claim 6, wherein the additive further comprises a compound of Chemical Formula 2:

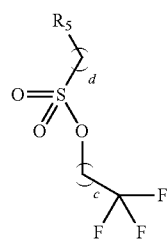

Chemical Formula 2 wherein
$R_6$ represents a $C_2$-$C_8$ perfluoroalkyl group;
c represents an integer selected from 1 to 7; and
d represents an integer selected from 0 to 3.

9. The electrolyte for a lithium secondary battery of claim 1, wherein the additive further comprises a compound of Chemical Formula 2:

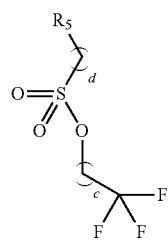

Chemical Formula 2 wherein
$R_6$ represents a $C_2$-$C_8$ perfluoroalkyl group;
c represents an integer selected from 1 to 7; and
d represents an integer selected from 0 to 3.

10. The electrolyte for a lithium secondary battery of claim 9, wherein the compound of Chemical Formula 2 is represented by Chemical Formula 2a:

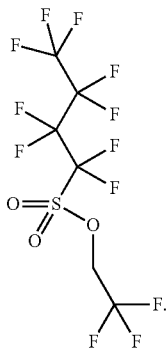

Chemical Formula 2a

11. The electrolyte for a lithium secondary battery of claim 9, wherein the additive is included in an amount of 0.1-10 parts by weight based on 100 parts by weight of the electrolyte.

12. The electrolyte for a lithium secondary battery of claim 9, wherein the non-aqueous solvent is one or more selected from the group consisting of ethylene carbonate (EC), diethyl carbonate (DEC), ethyl methyl carbonate (EMC), dimethyl carbonate (DMC), propylene carbonate (PC), dipropyl carbonate (DPC), butylene carbonate, methyl propyl carbonate, ethyl propyl carbonate, dimethyl sulfoxide, acetonitrile, dimethoxyethane, diethoxyethane, tetrahydrofuran, N-methyl-2-pyrrolidone (NMP), γ-butyrolactone and sulfolane.

13. The electrolyte for a lithium secondary battery of claim 9, wherein the lithium salt is one or more selected from the group consisting of $LiPF_6$, $LiBF_4$, LiCl, LiBr, LiI, $LiClO_4$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$ and $(CF_3SO_2)_2NLi$.

14. A lithium secondary battery comprising a cathode, an anode and the electrolyte of claim 9.

* * * * *